(12) United States Patent
Yu

(10) Patent No.: US 12,211,162 B2
(45) Date of Patent: Jan. 28, 2025

(54) METHOD FOR 3D RECONSTRUCTION, APPARATUS, SYSTEM, AND STORAGE MEDIUM

(71) Applicant: UISEE TECHNOLOGIES (ZHEJIANG) LTD., Jiaxing (CN)

(72) Inventor: Lidong Yu, Nanjing (CN)

(73) Assignee: UISEE TECHNOLOGIES (ZHEJIANG) LTD., Jiaxing (CN)

( * ) Notice: Subject to any disclaimer, the term of this patent is extended or adjusted under 35 U.S.C. 154(b) by 0 days.

(21) Appl. No.: 17/915,487

(22) PCT Filed: Nov. 22, 2019

(86) PCT No.: PCT/CN2019/120394
§ 371 (c)(1),
(2) Date: Sep. 29, 2022

(87) PCT Pub. No.: WO2021/097843
PCT Pub. Date: May 27, 2021

(65) Prior Publication Data
US 2024/0242451 A1   Jul. 18, 2024

(51) Int. Cl.
*G06T 19/20* (2011.01)
*G06T 7/50* (2017.01)
(Continued)

(52) U.S. Cl.
CPC ............... *G06T 19/20* (2013.01); *G06T 7/50* (2017.01); *G06T 7/70* (2017.01); *G06T 9/00* (2013.01);
(Continued)

(58) Field of Classification Search
None
See application file for complete search history.

(56) References Cited

U.S. PATENT DOCUMENTS 9,609,307 B1 * 3/2017 Lopez ............... G06T 7/557
2018/0018805 A1 * 1/2018 Kutliroff ............ G06V 20/20
(Continued)

FOREIGN PATENT DOCUMENTS

CN      104408762 A    3/2015
CN      106210700 A    12/2016
(Continued)

*Primary Examiner* — James A Thompson
(74) *Attorney, Agent, or Firm* — Bayramoglu Law Offices LLC

(57) ABSTRACT

A method, device, system and computer readable storage medium for 3D reconstruction are provided. The method includes: extracting original image features from an original 2D image of a target object; determining an original 3D object based on the original image features; determining a camera pose in the complementary view of the target object, where the complementary view is different from a first view in which the original 2D image is generated; generating a complementary 2D image of the target object in the complementary view based on the camera pose in the complementary view; performing 3D reconstruction based on the complementary 2D image to generate a complementary 3D object corresponding to the complementary 2D image; fusing the original 3D object and the complementary 3D object to obtain a 3D reconstruction result of the target object.

16 Claims, 14 Drawing Sheets

(51) Int. Cl.
*G06T 7/70* (2017.01)
*G06T 9/00* (2006.01)
*G06V 10/44* (2022.01)

(52) U.S. Cl.
CPC ...... *G06V 10/44* (2022.01); *G06T 2219/2016* (2013.01)

(56) References Cited

U.S. PATENT DOCUMENTS

2019/0026956 A1* 1/2019 Gausebeck ............. G06T 19/20
2019/0333269 A1* 10/2019 Matsunobu ........... G06T 15/205
2020/0184711 A1* 6/2020 Choi ...................... G06T 17/00
2020/0327718 A1* 10/2020 Saragih .................. G06T 9/002

FOREIGN PATENT DOCUMENTS

| CN | 108269300 A | 7/2018 |
| CN | 110148084 A | 8/2019 |
| WO | 2019211970 A1 | 11/2019 |

* cited by examiner

```
determining split-view 3D objects based on the original
image features extracted from the original 2D image in
             each view respectively
```

↕

```
fusing all the split-view 3D objects to obtain the original
                      3D objects
```

METHOD FOR 3D RECONSTRUCTION, APPARATUS, SYSTEM, AND STORAGE MEDIUM

CROSS REFERENCE TO THE RELATED APPLICATIONS

This application is the national phase entry of International Application No. PCT/CN2019/120394, filed on Nov. 22, 2019, the entire contents of which are incorporated herein by reference.

TECHNICAL FIELD

This disclosure relates to the field of computer visual technology, and more particularly to a 3D reconstruction method, apparatus, system and storage medium.

BACKGROUND 3D (three-dimensional) reconstruction is a process of generating a corresponding 3D object based on a known 2D (two-dimensional) images. Since 2D image are a target object taken at a specific camera view, it can only reflect features of the target object under the specific view, but cannot show all features of the target object. In theory, more camera views are selected when photographing the target object, the higher the reproduction of the 3D object generated by the 3D reconstruction relative to the target object, and the better the reconstruction quality.

However, in practical situations, 3D reconstruction based on 2D images with limited views will make the reconstruction multi-isotropic due to unavoidable occlusion and other problems. It is expected to use 2D images with more views to obtain better reconstruction results. However, due to the geographic location of the target object, surrounding environment occlusion and other reasons may not be able to obtain the 2D images in the desired viewpoint. Therefore, it is difficult to obtain satisfactory 3D reconstruction results.

SUMMARY

The present disclosure is proposed in consideration of the above problems.

An aspect of the present disclosure provides a method for 3D reconstruction. The method includes:
  extracting original image features from an original 2D image of a target object;
  determining an original 3D object based on the original image features;
  determining a camera pose in the complementary view of the target object, where the complementary view is different from a first view in which the original 2D image is generated;
  generating a complementary 2D image of the target object in the complementary view based on the camera pose in the complementary view;
  performing 3D reconstruction based on the complementary 2D image to generate a complementary 3D object corresponding to the complementary 2D image; and
  fusing the original 3D object and the complementary 3D object to obtain a 3D reconstruction result of the target object.

In some embodiments, said determining the original 3D object based on the original image features including:
  decoding the original image features by a deep neural networks to obtain a depth map of the target object;
  decoding the original image features by a voxel neural network to obtain a voxel cube of the target object; and
  determining the original 3D object based on the depth map and the voxel cube.

In some embodiments, said determining the original 3D object based on the depth map and the voxel cube including:
  determining visible voxels in the original 3D object based on the depth map; and
  determining other voxels in the original 3D object based on the voxel cubes.

In some embodiments, the depth map of the target object includes a depth map of main view of the target object and a depth map of rear view of the target object.

In some embodiments, the original 2D image includes a plurality of images in different views, said determining the original 3D object based on the original image features including:
  determining split-view 3D objects based on the original image features extracted from the original 2D image in each view respectively; and
  fusing all the split-view 3D objects to obtain the original 3D objects.

In some embodiments, said fusing all the split-view 3D objects to obtain the original 3D objects including:
  rotating each split-view 3D object to a standard pose to obtain a standard view 3D object corresponding to the split-view 3D object; and
  determining voxels of the original 3D object based on voxels of all standard view 3D objects.

In some embodiments, said determining voxels of the original 3D object based on voxels of all standard view 3D objects including:
  For each location involved in all standard view 3D objects, when a number of the standard view 3D objects having voxels present at the location among all standard view 3D objects is more than a first percentage, determining that the original 3D object has voxels present at the location.

In some embodiments, said determining the camera pose in the complementary view of the target object including:
  obtaining the camera pose in at least one of candidate views predetermined;
  for camera poses of each candidate view, rotating the original 3D object to the candidate view to obtain candidate view 3D object;
  determining an original visible proportion of the visible voxels of the candidate view 3D object; and
  determining the camera pose in the candidate view as the camera pose in the complementary view based on the original visible proportion within a first range.

In some embodiments, said determining the original visible proportion of the visible voxels of the candidate view 3D object including:
  projecting the candidate view 3D object to obtain a projection map based on the candidate view;
  counting number of visible pixels of the candidate view 3D object in the first view in the projection map; and
  determining the original visible proportion based on the number of pixels counted and the total number of pixels of the candidate view 3D object.

In some embodiments, said generating a complementary 2D image of the target object in the complementary view based on the camera pose in the complementary view including:
  calculating a lateral rotation angle and a longitudinal rotation angle between the camera pose in the first view and the camera pose in the complementary view;

stitching vectors consisting of the lateral rotation angle and the longitudinal rotation angle and each vector of the original image features, and taking all vectors stitched as the complementary image features; and generating the complementary 2D image based on the complementary image features.

In some embodiments, said generating a complementary 2D image of the target object in the complementary view based on the camera pose in the complementary view including:

extracting target features based on a projection map of the original 3D object in the complementary view and the original image features; and generating the complementary 2D image based on the target features.

In some embodiments, said extracting the target features based on the projection map of the original 3D object in the complementary view and the original image features including:

for pixels in the projection map that correspond to the visible voxels of the original 3D object in the first view, determining feature vectors of the target features based on the original image features; and for other pixels in the projection map, determining feature vectors of the target features based on random noise.

In some embodiments, the original 2D image includes a plurality of images in different views, the original image features include a plurality of features corresponding to each image in different views, said determining feature vectors of the target features based on the original image features including:

for pixels in the projection map that corresponds to visible voxels in the original 3D object in the first view, averaging the feature vectors of the plurality of original image features to use average value as the feature vector of the target feature.

In some embodiments, said extracting target features based on the projection map of the original 3D object in the complementary view and the original image features including:

stitching the projection map and the feature vectors determined to generate the target features.

In some embodiments, said fusing the original 3D object and the complementary 3D object to obtain a 3D reconstruction result of the target object including:

determining whether the percentage of visible voxels in the 3D reconstruction result is greater than a second ratio;

in response to that it is not greater than the second ratio, taking the complementary 2D image as the original 2D image, and performing the 3D reconstruction again based on camera pose in the complementary view until the percentage of visible voxels in the 3D reconstruction result is greater than the second ratio.

Another aspect of the present disclosure provides a device for 3D reconstruction, including:

a feature extracting module, is configured to extract original image features from an original 2D image of a target object;

a first reconstruction module, is configured to determine an original 3D object based on the original image features;

a complementary view module, is configured to determine a camera pose in a complementary view of the target object, where the complementary view is different from a first view in which the original 2D image is generated;

a complementary image module, is configured to generate a complementary 2D image of the target object in the complementary view based on the camera pose of the complementary view;

a second reconstruction module, is configured to perform 3D reconstruction based on the complementary 2D image to generate a complementary 3D object corresponding to the complementary 2D image; and a fusing module, is configured to fuse the original 3D object and the complementary 3D object to obtain the 3D reconstruction result of the target object.

Another aspect of the present disclosure provides a system for 3D reconstruction, including: a processor and a memory, where, the memory stores computer program instructions, the computer program instructions being executed by the processor to perform a method for 3D reconstruction described above.

Another aspect of the present disclosure provides a storage medium, storing computer program instructions, where the computer program instructions are executed to perform a method for 3D reconstruction described above.

According to the technical solution of embodiments of the present disclosure, adding 2D images of the target object in complementary view based on the original 2D image and then performing 3D reconstruction based on the 2D images in the complementary view and the original 2D image may obtain more credibility information of the target object and improve reconstruction quality of the 3D object.

The above description is only an overview of the technical solution of the present disclosure. In order to understand more clearly the technical means of the present disclosure, which can be implemented in accordance with the contents of the specification, and in order to make the above and other purposes, features and advantages of the present disclosure more obvious and understandable, specific embodiments of the present disclosure are given below.

BRIEF DESCRIPTION OF THE DRAWINGS

The foregoing and other objects, features and advantages of the present disclosure will become more apparent by a more detailed description of embodiments of the present disclosure in conjunction with the accompanying drawings. The accompanying drawings are used to provide further understanding of embodiments of the present disclosure and form part of the specification and, together with embodiments of the present disclosure, are used to explain the disclosure and do not constitute a limitation of the disclosure. In the accompanying drawings, identical reference marks generally represent identical parts or steps.

DETAILED DESCRIPTION OF THE EMBODIMENTS

To make the objects, technical solutions, and advantages of the present disclosure more clear, exemplary embodiments of the present disclosure will be described in detail with reference to the accompanying drawings as follows. Obviously, the described embodiments merely are part of the embodiments of the present disclosure, rather than all of the embodiments of the present disclosure, it should be understood that the present disclosure is not limited to the exemplary embodiments described herein. Based on the embodiments described in the present disclosure, all other embodiments obtained by those skilled in the art without paying inventive efforts should fall into the protection scope of the present disclosure.

In the scheme for 3D reconstruction of the present disclosure, on the basis of an original 2D image, a 2D image in the complementary view different from an original view is generated, so that the 3D reconstruction can be performed based on the 2D image of the original view and the 2D image of the complementary view together to obtain 3D reconstruction results with higher restoration and better reconstruction quality.

Figure 1:
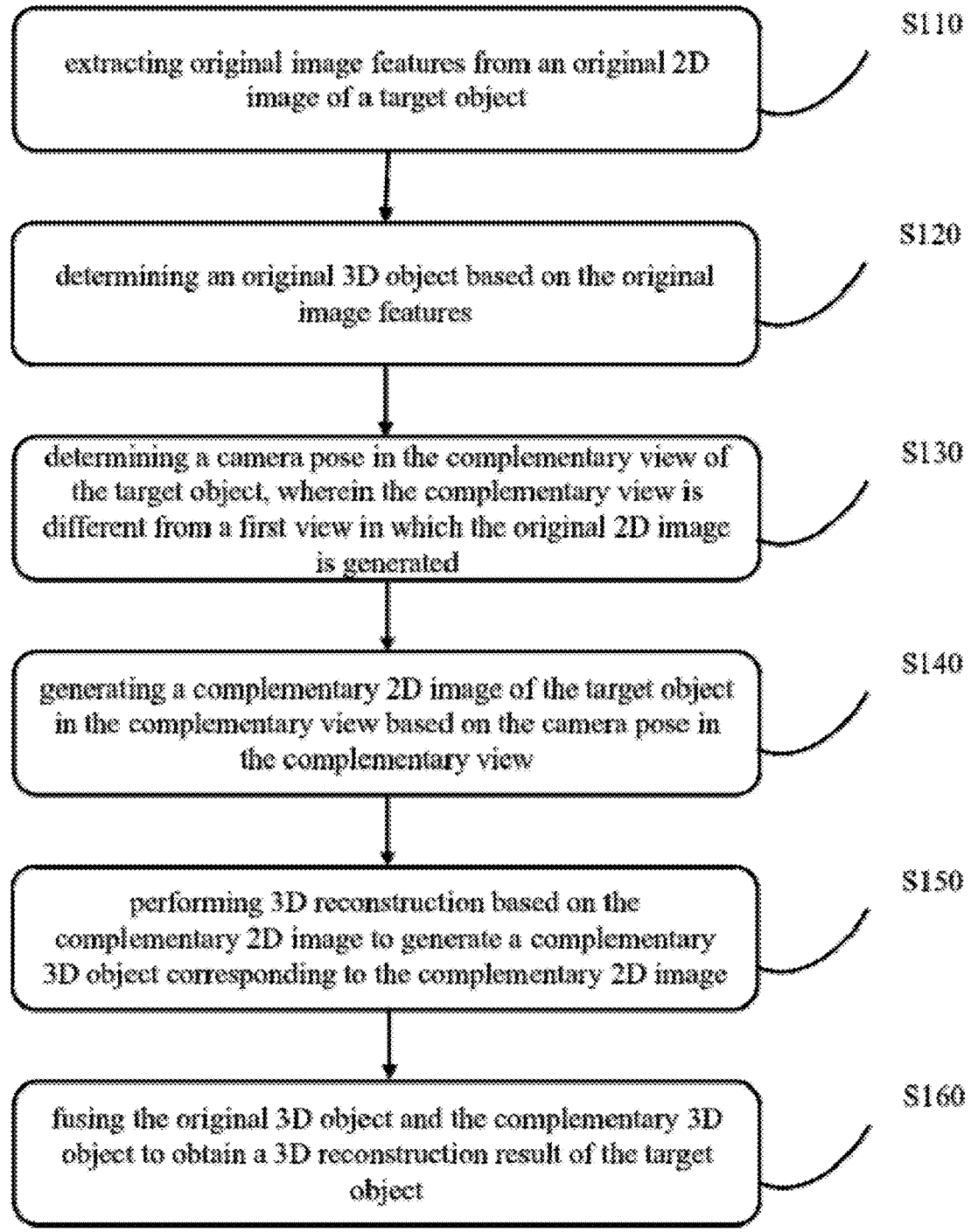
FIG. 1 illustrates a schematic flowchart of a method 100 for 3D reconstruction according to an embodiment of the present disclosure.

FIG. 1 illustrates a schematic flowchart of a method 100 for 3D reconstruction according to an embodiment of the present disclosure. As shown in FIG. 1, the method 100 may include following steps.

S110: Extracting original image features from an original 2D image of a target object.

The original 2D image may be an image of the target object captured directly by an imaging device, for example, a camera or a video camera. The original 2D image may also be an pre-processing image. For example, a pre-processing operation, such as filtering, can be performed on the captured image to obtain the original 2D image with a better quality. The original 2D image may be a single image captured in a single view, or multiple images captured in multiple different views.

Exemplarily, the original image features may be extracted from the original 2D image of the target object using an encoder composed of a convolutional neural network (CNN). A person of ordinary skill in the art can understand that step S110 can be completed based on any existing or future developed method for extracting image features, such as Harris corner point detection algorithm, SIFT algorithm, etc. The present disclosure does not limit this.

The original image features may include a plurality of feature vectors, where each of the feature vectors corresponding to a corresponding pixel point in the original 2D image. Taking a single original 2D image as an example, H×W feature vectors can be extracted from the single original 2D image (H indicates the height of the single original 2D image, and W indicates the width of the single original 2D image. The dimensionality of each feature vector is C.

S120: determining an original 3D object based on the original image features.

Exemplarily, the original 3D object may be generated based on the original image features using a decoder including a convolutional neural network.

The generated original 3D object is corresponding to the original 2D image. The original 3D object may be represent by a Point Cloud, a Mesh, a Voxel, or a Depth Map, etc.

In an embodiment of the present disclosure, the original 3D object may be represented by voxel. The representation of voxel is to consider the space of the target object as a voxel cube consisting of multiple cubes, the value of each cube indicating whether whether the object exits a voxel at the space position of each cube. For example, the value of 0 may indicate that no voxel exists in the space position corresponding to the cube, and the value of 1 may indicate that a voxel exists.

The 3D reconstruction of the original 2D image of the target object is implemented through the step S110 and step S120. It can be understood by persons of ordinary skill in the art that the encoder and decoder described in the above steps S110 and step S120 are used for example only and do not constitute a limitation of the present disclosure. A person of ordinary skill in the art can implement the above two steps using any existing or future developed algorithms for 3D reconstruction based on known 2D images.

S130: determining a camera pose of the complementary view of the target object, where the complementary view is different from a first view in which the original 2D image is generated.

It can be understood that each 2D image corresponds to a camera view, the camera view being the view that the camera captures the 2D image. The camera view is determined by the camera pose, and the camera view can be represented by the camera pose. The camera pose is the position and attitude of the camera when capturing a 2D image, and can be represented based on various coordinate systems. The following is an example of the camera pose in a spherical coordinate system. For example, the location of the target object can be taken as the origin of the spherical coordinate system, and the camera pose can be represented by R and T. R=[α, β], where a represents azimuth of the camera and B represents the elevation of the camera; T represents the distance p between the camera and the target object.

Figure 2:
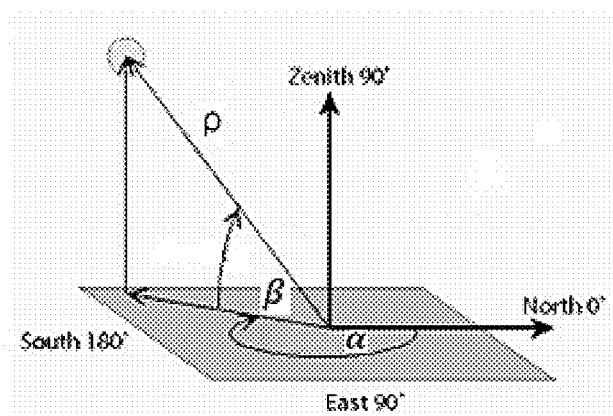
FIG. 2 illustrates the transformation relationship between the world coordinate system and the spherical coordinate system according to an embodiment of the present disclosure.

A person having ordinary skill in the art understands that there is a corresponding transformation relationship between the world coordinate system and the spherical coordinate system. If the coordinate (x, y, z) of the camera in the world coordinate system is known, the azimuth a, the elevation B, and the distance p in the spherical coordinate system can be determined correspondingly, where x denotes the coordinates of the camera in the X-axis, y denotes the coordinates of the camera in the Y-axis, z denotes the coordinates of the camera in the Z-axis. FIG. 2 illustrates the transformation relationship between the world coordinate system and the spherical coordinate system.

The camera pose of α=0, β=0, ⊥p=1 may be called a standard pose of the camera. The view corresponding to the standard pose may be called a standard view. The pose of the 3D object corresponding to the standard pose of the camera may be referred as a standard posture. The original 3D object may be transformed to be in the standard posture at step S120 when the original 3D object is determined. Thus, different camera poses can be represented as different azimuth and elevation angles, i.e., different vectors [α, β].

A person having ordinary skill in the art understands that the camera pose can be determined based on the camera parameters corresponding to the original 2D image for a given original 2D image. For simplicity of description, the view corresponding to the camera pose of the original 2D image can be referred to as a first view. In the basis of the first view of the known original 2D image, the present step determines a new complementary view, where the complementary view is different from the first view. In other words, the camera pose corresponding to the complementary view is different from the camera pose corresponding to the first view.

Exemplarily, the camera pose of the complementary view may be determined based on the first view and the preset rule. For example, on the basis of the camera pose of the first view, the azimuth and/or elevation angles may be changed based on the preset rule. Specifically, the complementary view may be determined by adding the azimuth angle of the first view with a predetermined degrees.

S140: generating the complementary 2D image of the target object in the complementary view based on the camera pose of the complementary view.

On the basis of the camera pose of the complementary view, the complementary 2D image of the target object at the complementary view can be generated based on the original image information of the original 2D image. The original image information may be derived, for example, from the original image features or the original 3D object, or even from the original 2D image.

The complementary view for generating the complementary 2D image is different from the first view for generating the original 2D image so that the complementary 2D image is different from the original 2D image. Since the surface of the target object is generally continuously changing, there is confidence in predicting the part of the target object that is not visible in the first view based on the original image information. The complementary 2D image may contain information that is not present in the original 2D image, and the information is reliable to some extent. The complementary 2D image can have a complementary enriching role to the original image information.

S150: performing 3D reconstruction based on the complementary 2D image to generate a complementary 3D object corresponding to the complementary 2D image.

The present step is similar to steps S110 and S120, except that the steps 110 and $120 operate on the original 2D image, while the present step 150 operates on the complementary 2D image. Exemplarily, the step S150 may include: firstly, extracting complementary image features from the complementary 2D image using an encoder composed of a convolutional neural network; and then, determining a corresponding complementary 3D object based on the complementary image features using a decoder composed of a convolutional neural network.

In one example, the complementary 3D object is represented by Voxel. It can be understood that visible voxel of the complementary 3D object in the complementary view is different from the visible voxel of the original 3D object in the first view since the complementary 2D image includes information which does not exist in the original 2D image.

S160: Fusing the original 3D object and the complementary 3D object to obtain a 3D reconstruction result of the target object.

Exemplarily, the final 3D reconstruction result of the target object can be determined by taking a merge set of voxels of the original 3D object and voxels of the complementary 3D object. For any space position, the 3D reconstruction result may be determined to exist voxel at the space position at which either original 3D object or the complementary 3D object has voxels.

Alternatively, the final 3D reconstruction result of the target object can be determined by taking a intersection set of voxels of the original 3D object and voxels of the complementary 3D object. For any space position, the 3D reconstruction result may be determined to exist voxel at the space position at which both original 3D object and the complementary 3D object have voxels.

Generating a complementary 2D image in a different camera view from the original 2D image may add more information for 3D reconstruction. Thus, a more desirable 3D reconstruction results may be obtained.

Figure 3:
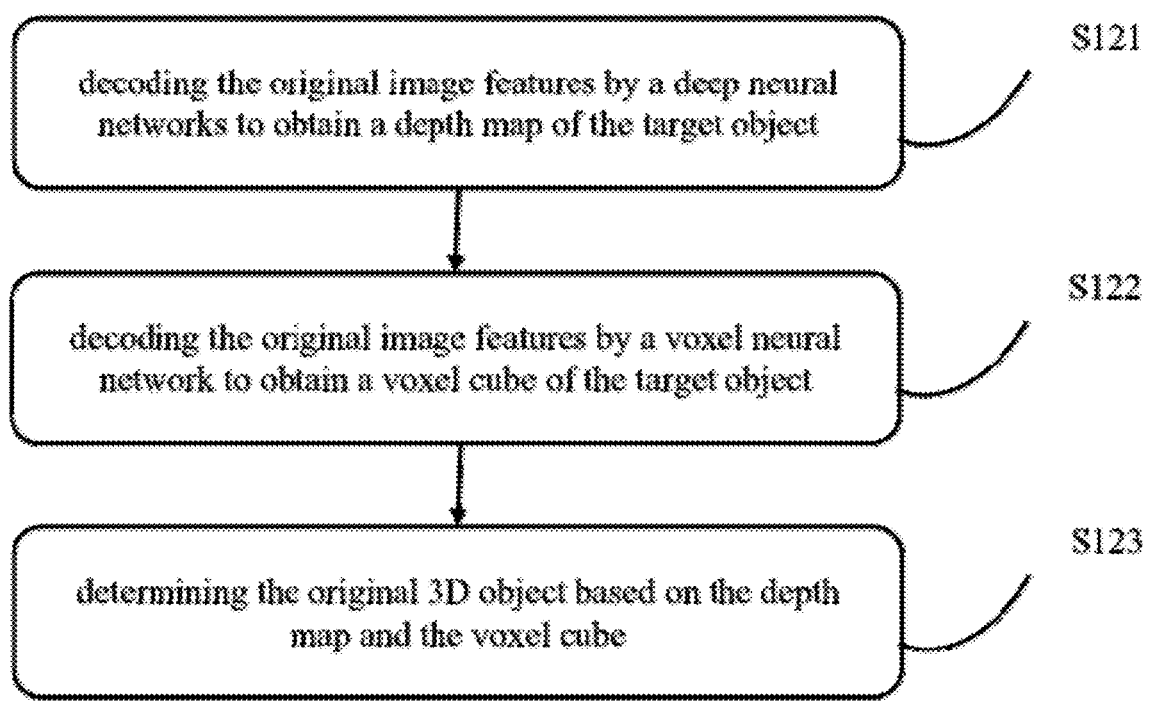
FIG. 3 illustrates a schematic flowchart of step S120 of determining the original 3D object according to an embodiment of the present disclosure.

FIG. 3 illustrates a schematic flowchart of step S120 of determining the original 3D object according to an embodiment of the present disclosure. As previously described, the original 3D object may be generated based on the original image features using a decoder including neural network. In the embodiment, the decoder including neural network may be implemented using deep neural networks and voxel neural networks. As shown in FIG. 3, the step S120 includes following steps:

S121: decoding the original image features by the deep neural networks to obtain the depth map of the target object.

In one example, the depth neural network may include multiple 2D convolutional layers. Each pixel in the depth map may represent the depth of corresponding location of the target object. The depth may be the distance between the corresponding location of the target object and the camera.

For each feature vector in the original image features, the depth d of the pixel in the original 2D image corresponding to that feature vector may be calculated by the following equation.

$$d = \sum_{i=1}^{c} \sigma(F, \dim = 1) \times i$$

where i denotes the element of the feature vector, and represents the probability value of i obtained by the feature vector F performing the softmax function operation along the direction of depth, and C denotes the maximum depth. For example, assuming that the feature vector F is an 8-dimensional vector [0,0,0,1,1,0,0,0], where C=8 and i=4 and 5. At this point, d=σ(F, dim=1)×4+(F, dim=1)×5, if o(F, dim=1)=0.5, then d=0.5×4+0.5×5=4.5, it means that the depth of the pixel corresponding to the feature vector in the original 2D image is 4.5.

The view of the camera acquiring the original 2D image may be called a main view, also referred as the first view described above. The depth map in the main view may be generated based on the original image features.

In addition, the depth map generated based on the original image features may further include a depth map of the rear view. Exemplarily, the target object may be considered to be symmetrical to a plane perpendicular to the direction of the main view. Thus, although part of the target object visible in the rear view is actually not visible in the main view, the depth map of the rear view can be obtained based on the original image features.

S122: decoding the original image features by the voxel neural network to obtain a voxel cube of the target object.

The voxel neural network may also include a plurality of 2D convolutional layers which are configured to output a voxel cube consisting of a plurality of stereo squares based on the original image features. In the voxel cube, if the value of the stereo square is 1, the target object has voxels at the spatial location where the stereo square is located. If the value of the stereo square is 0, the target object does not have voxels at the spatial location of the stereo square.

S123: determining the original 3D object based on the depth map and the voxel cube.

As described above, the depth map may include the depth map of the main view and the depth map of the rear view, where the depth map of the main view may include 3D information of a front surface of the target object and the depth map of the rear view may include 3D information of a rear surface of the target object. The 3D information of the target object may be determined based on the 3D information of the front surface and the 3D information of the rear surface. Exemplarily, the portion between the front surface and the rear surface may be taken as the target object reconstructed based on the depth map. The points of the front surface obtained based on the depth map of the main view may be connected to the corresponding points of the rear surface obtained based on the depth map of the rear view, and the space enclosed by the front surface, the rear surface and all connecting lines is the space occupied by the target object reconstructed based on the depth map.

The original 3D object may be determined by fusing the target object reconstructed based on the depth map and the voxel cube obtained based on the original image features. In one example, a particular location may be determined presence of the target object in the case that the particular location of both the target object reconstructed based on the depth map and the voxel cube obtained based on the original image features are the target object.

Determining the original 3D object based on the depth map and the voxel cube may utilize information of the original 2D image effectively and make the original 3D object more closer to the target object.

In a specific example, the step S123 may include: firstly, determining the visible voxels in the original 3D object based on the depth map; and then, determining the other voxels in the original 3D object based on the voxel cubes.

As previously described, the depth map may include a depth map of the main view. The depth map of the main view is obtained directly based on the original 2D image, so the voxels determined based on the depth map of the main view may be considered as the visible voxels. The visible voxels may have a higher confidence level and better reflect the actual shape of the target object. Exemplarily, the depth map may also include the depth map of the rear view. Since most objects have a front-to-back symmetric relationship, the voxels determined based on the depth map of the rear view may be considered as visible voxels as well. The visible voxels of the original 3D object in the main view and the rear view may be determined based on the depth map of the main view and the depth map of the rear view. It may be understood that although the voxel cube also contains voxels on the front surface and the rear surfaces, determining the visible voxels based on the depth map may be more accurate than determining the visible voxels based on the voxel cube.

However, the depth map of the main and the depth map of the rear view may do not reflect the other spatial features of the target object. Other voxels in the original 3D object are not visible in the original 2D image. The other voxels can be determined based on the voxel cube generated by the voxel neural network. The voxel cube may contain voxels on other surfaces besides the front surface (visible in the main view) and the rear surface (visible in the rear view), and these voxels may be used to determine voxels on surfaces other than the front surface and the rear surfaces of the original 3D object.

Figures 4A, 4B:
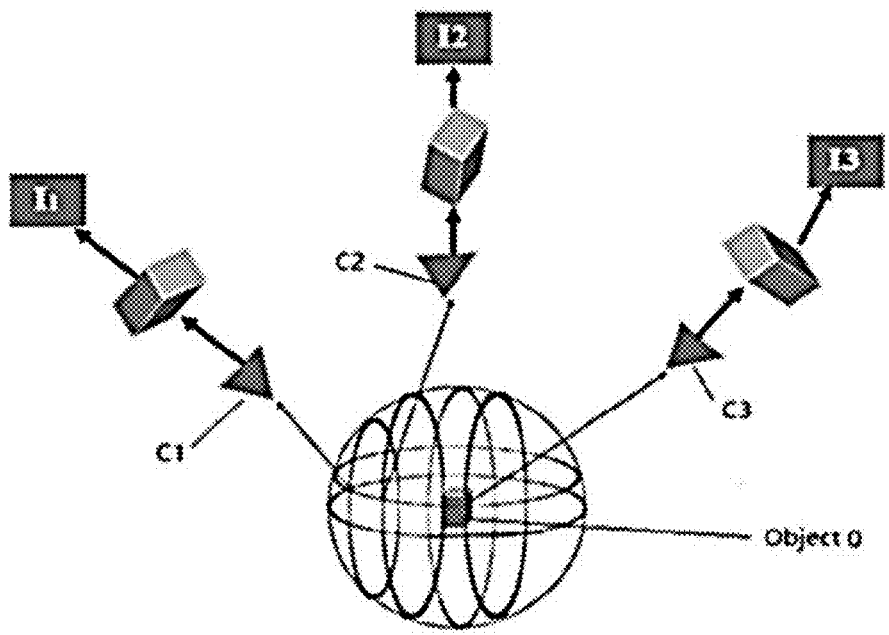
FIG. 4A illustrates a schematic flowchart for determining an original 3D object based on multiple original 2D images according to an embodiment of the present disclosure.
FIG. 4B illustrates a schematic diagram of different original 2D images obtained by cameras at different views according to an embodiment of the present disclosure.

Determining the visible voxels of the original 3D object based on the depth map and determining other voxels based on the voxel cube may obtain an original 3D object with higher reliability and accuracy. As previously described, the original 2D image may include multiple images obtained at multiple different views. FIG. 4A illustrates a schematic flowchart for determining an original 3D object based on multiple original 2D images according to an embodiment of the present disclosure. As shown in FIG. 4A, when the original two-dimensional image contains multiple images in different views, the step S120 of determining the original 3D object may include the following steps.

Firstly, a corresponding split-view 3D object is determined based on the corresponding original image features extracted from the original 2D image of each view, respectively.

As previously described, each original 2D image of the target object corresponds to the view in which the camera acquires the original 2D image respectively. FIG. 4B illustrates a schematic diagram of different original 2D images obtained by cameras at different views according to an embodiment of the present disclosure. As shown in FIG. 4B, C1, C2, and C3 may represent cameras in with different pose. The original 2D images 11, 12 and 13 corresponding to the respective views can be obtained by photographing the target object in the standard pose using C1, C2 and C3, respectively.

For the original 2D images 11, 12 and 13 in each view, a 3D object corresponding to the view of the original 2D image can be obtained by 3D reconstruction, which is herein called a split-view 3D object. It can be understood that each split-view 3D object corresponds to a different original 2D image, and thus the voxels of each split-view 3D object may also be different.

Then, all the split-view 3D objects may be fused to obtain the original 3D objects. Exemplarily, the original 3D object may be determined in the step based on the voxels contained in the plurality of the split-view 3D objects. The fusion of the various split-view 3D objects can be performed using any prior art or future developed algorithms, and this application does not limit this.

In the above embodiment, the original 3D object may be determined based on a plurality of images at different views. The images may contain more credible information of the target object. As a result, it can make the 3D reconstruction results of the present disclosure more accurate.

Figure 5A:
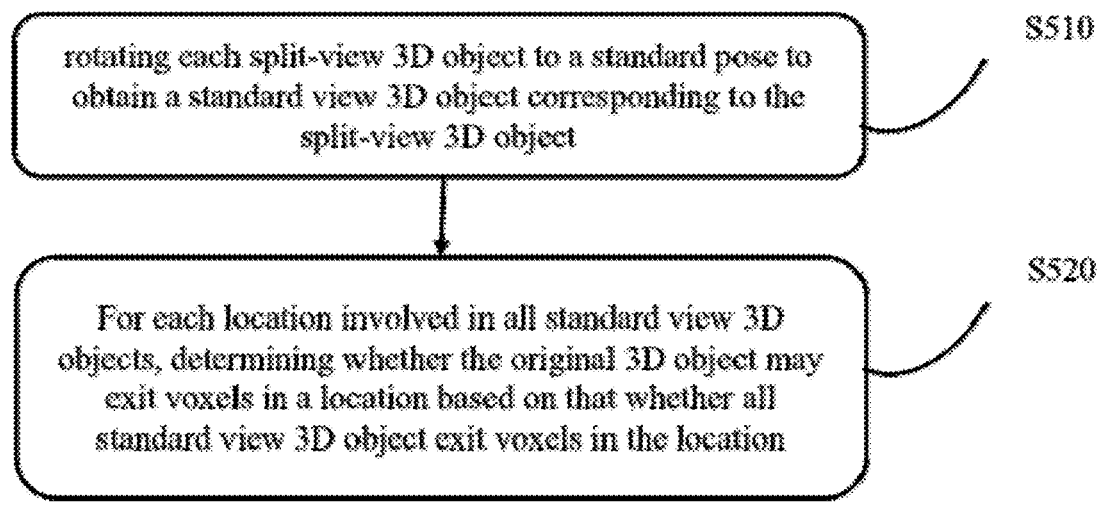
FIG. 5A illustrates a schematic flowchart for fusing all of the split-view 3D objects according to an embodiment of the present disclosure.

FIG. 5A illustrates a schematic flowchart for fusing all of the split-view 3D objects according to an embodiment of the present disclosure, and as shown in FIG. 5A, fusing a plurality of the split-view 3D objects may include the following steps.

S510: Rotating each split-view 3D object to a standard pose to obtain a standard view 3D object corresponding to the split-view 3D object.

Each split-view 3D object may be generated based on the respective corresponding original 2D image, which corresponds to the respective view. In order to facilitate the fusion of multiple split-view 3D objects, each split-view 3D object can be rotated to a uniform standard pose firstly. As a result, a spatial shape of each split-view 3D object in a same standard view, which also may be referred as a standard view 3D object, can be obtained.

S520: determining voxels of the original 3D object based on voxels of all standard view 3D object.

For each location involved in all standard view 3D objects, it can be determined that whether the original 3D object may exit voxels in a location based on that whether all standard view 3D object exit voxels in the corresponding location. Exemplarily, the voxels of the original 3D object may be determined based on the concatenation or intersection of the voxels of all standard view 3D objects.

Figure 5B:
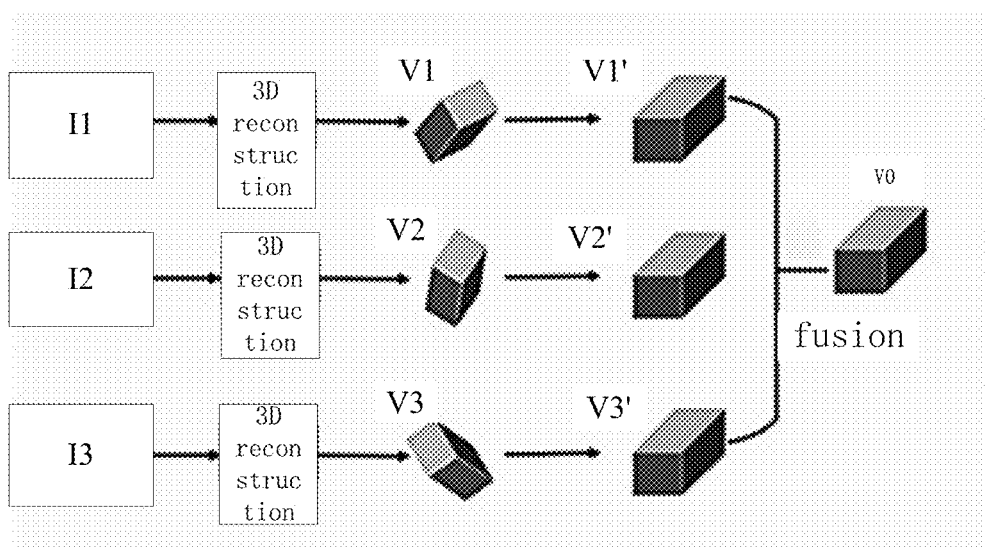
FIG. 5B illustrates a schematic block diagram for determining an original 3D object based on a plurality of original 2D image according to an embodiment of the present disclosure.

FIG. 5B illustrates a schematic block diagram for determining an original 3D object based on a plurality of original 2D image according to an embodiment of the present disclosure. The respective corresponding split-view 3D objects V1, V2, and V3 may be obtained by performing 3D reconstruction of the original 2D image 11, 12 and 13 in different view. The V1, V2 and V3 may be rotated to the standard pose to obtain the respective corresponding standard view 3D objects V1', V2' and V3'. Finally, the original 3D object may be obtained by fusing the corresponding standard view 3D objects V1', V2' and V3'. It can be understood that in the process of determining the original 3D object as shown in FIG. 5, the process of extracting the original image features from the original 2D image is ignored, but the persons of ordinary skill in the art will be able to understand the process by the above description.

In the above technical solution, rotating each split-view 3D object to a standard pose firstly, and then fusing the rotated standard-view 3D object, may not only easy to achieve, but also ensure the accuracy of the results.

In a specific embodiment, the standard view 3D object may be represented as a voxel. It can be determined whether voxels are present at the corresponding position of a stereo square based on whether the stereo square takes the value of 1 or 0. When a number of the standard view 3D objects among all standard view 3D objects having voxels present at a location is more than a first percentage, it is determined that the original 3D object has voxels present at the location.

For example, assuming that there are k standard view 3D objects, there are m standard view 3D objects exit voxels for a location in the space (the value of the location of the stereo square may be 1), then if the m/k is greater than the first percentage, it may be determined that the original 3D object may exist voxel in the location. In one example, the first percentage may be 0.5.

The above process may be implemented using a voting function with the following equation.

$$O'(x, y, z) = \sum_{i=1}^{k} P_i(x, y, z)$$

Where if $$O'(x, y, z) > \frac{k}{2}, O(x, y, z) = 1,$$

Otherwise, O(x, y, z)=0

Where (x, y, z) denotes the coordinates of a location in space, k denotes the number of standard view 3D object, Pi(x, y, z) denotes the value of the stereo square of the location which the i-th standard view 3D object is in. O(x, y, z) denotes the value of stereo square of the location which the original 3D object is in.

In the above technical solution, the original 3D object is determined based on the number of voxels present at a location in all standard view 3D objects. The original 3D object may be closer to the real target object. As a result, the 3D reconstruction results obtained by the technical solution may be more desirable.

Figure 6:
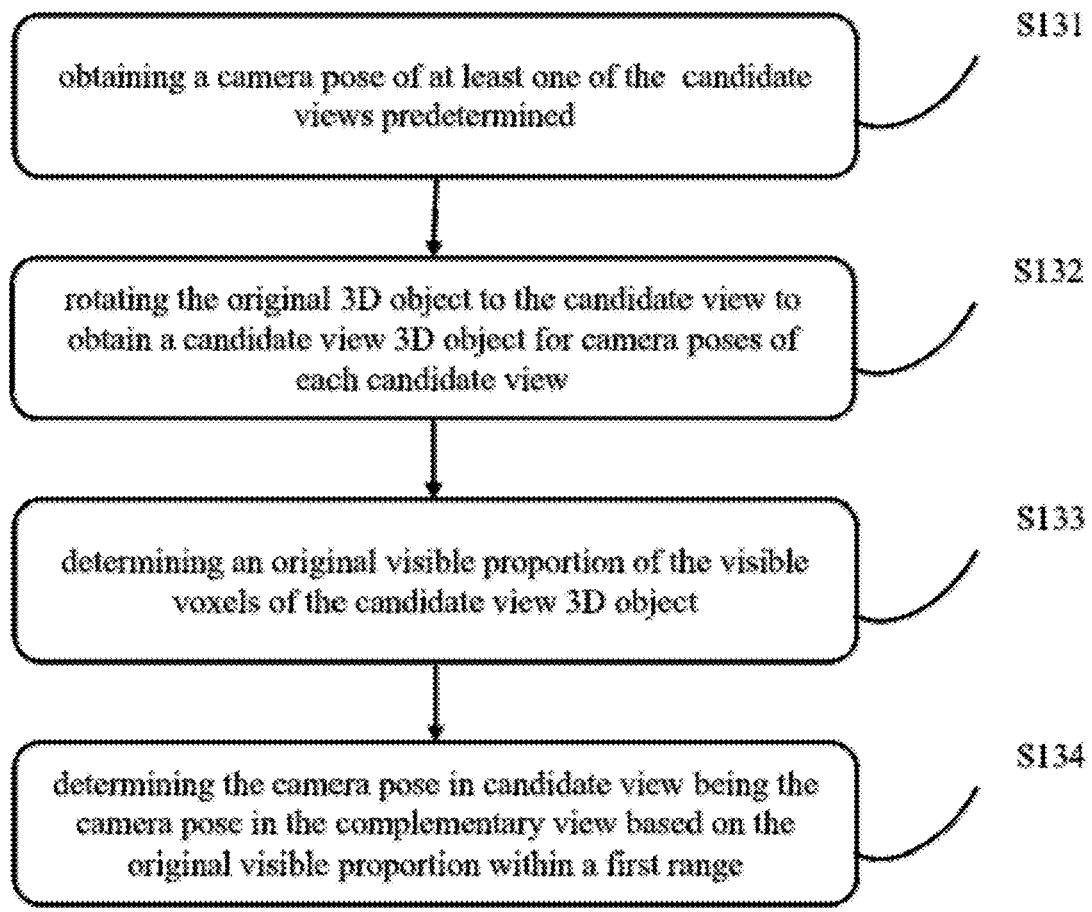
FIG. 6 illustrates a schematic flowchart for determining a camera pose for a complementary view according to an embodiment of the present disclosure.

As previous described, after step S120 of determining the original 3D object, the step S130 is required to further determine the camera pose of the the complementary view of the target object. FIG. 6 illustrates a schematic flowchart for determining a camera pose for a complementary view according to an embodiment of the present disclosure. As shown in FIG. 6, step S130 of determining the camera pose of the complementary viewpoint may include the following steps.

S131: Obtaining a camera pose of at least one of the predetermined candidate views.

The camera pose of each candidate view may be expressed as azimuth and elevation angles in a spherical coordinate system, represented by vectors (α, β). Exemplarily, a camera pose with an azimuth angle of an element of the set [0,45,90,135,180,225,270,315], an elevation angle of an element of the set [−60,−30,0,30,60] and a distance of 1 is selected based on the center point of the target object as the origin of the coordinate system. It can be understood that in the example, a total of 40 camera poses may be selected.

S132: Rotating the original 3D object to the candidate view to obtain corresponding candidate view 3D object for camera poses of each candidate view.

Specifically, the original 3D object may be rotated from under the current view to the candidate view. It can be understood that the current view of the original 3D object may be the first view corresponding to the original 2D image. In particular, if there is only a single original 2D image, the original 3D object can be determined directly based on the first view, and the operation may be simpler. Alternatively, the current view of the original 3D object may also be the standard view. According to the embodiments described above, if there are multiple images of the original 2D image in different view, the obtained original 3D object may be in the standard view.

For example, if the camera pose in the current view may be (α1, β1), and the camera pose in the candidate view may be (α2, β2), the original 3D object may be rotated by an angle of (α2-α1, β2-β1) to obtain the candidate view 3D object.

S133: determining an original visible proportion of the visible voxels of the candidate view 3D object for the camera pose in each candidate view.

The visible voxels of the candidate view 3D object may indicate the visible voxels of the candidate view 3D object in the candidate view. The visible voxels of 3D object may be different in different views. Taking a car as an example, if the first view corresponding to the original 2D image (0, 0) is the view facing the front of the car, the voxels forming the front of the car may be visible voxels in the first view, for example, the voxels forming the headlights, the voxels forming the wipers, the voxels forming the hood, and so on may be visible voxels. When the car is rotated to the candidate view, for example, the left view (90, 0), the voxels forming the left door of the car may be visible voxels, while the voxels forming the wipers may be not visible voxels.

The original visible proportion may be a percentage of the visible voxels in the candidate view 3D object to the visible voxels in the first view. It can be understood that if the original 2D image may include multiple images in different views, the first view may include multiple views. It can be understood that visible voxels of a 3D object in the candidate viewpoint may or may not be visible in the first view. In the aforementioned example of the car, in the visible voxels in the left view of the car, the voxels of the part near the front of the car may be visible in the front view, while the voxels of the part near the rear of the car may be not visible in the front view. Thus, the original visible proportion of the visible voxels of the car in the left view may be the proportion of pixels of the visible voxels in the left view to the pixels of the visible voxels in the first view.

S134: Determining the camera pose in candidate view being the camera pose in the complementary view based on the original visible proportion within a first range for the camera pose in each candidate view.

The original visible proportion may reflect the credibility of the candidate view 3D object. The original 3D object may be generated based on the original 2D image. The visible pixels of the original 2D image can truly reflect the shape of the target object and may be plausible pixels. The visible voxels in the first view of the original 3D object determined based on the pixels of the original 2D image may be also credible. The credibility of the other voxels of the original 3D object except the visible voxels in the first view is lower than the credibility of the visible voxels in the first view. For the above reasons, a person of ordinary skill in the art can understand that the higher the original visible proportion of the visible voxels of the candidate view 3D object, the higher the credibility of the candidate view 3D object; otherwise, the lower the credibility of the candidate viewpoint 3D object.

The purpose of the step may be to select a candidate view with original visible ratio within a suitable range as the complementary view during 3D reconstruction. The credibility of the 3D object in the complementary view should not be too low, otherwise it is meaningless to performing 3D reconstruction in the complementary view; meanwhile, the credibility of the 3D object in the complementary view should not be too high, otherwise it will be too close to the first view to complement information. In one example of the present disclosure, the first range may be 50%-85%, and the candidate view with the original visible ratio within the first range may be referred as the complementary view for 3D reconstruction, and the camera pose in the candidate view may be the camera pose of the complementary view. The first range may ensure that the credibility of the 3D object in the complementary view is high enough, and also ensure to complement information with effective amount.

In the above embodiment, determining the camera pose in the complementary view based on the original visible proportion of the visible voxels of the candidate view 3D object may enable that the 3D reconstruction results obtained based on the camera pose in the complementary view are more accurate.

Figure 7:
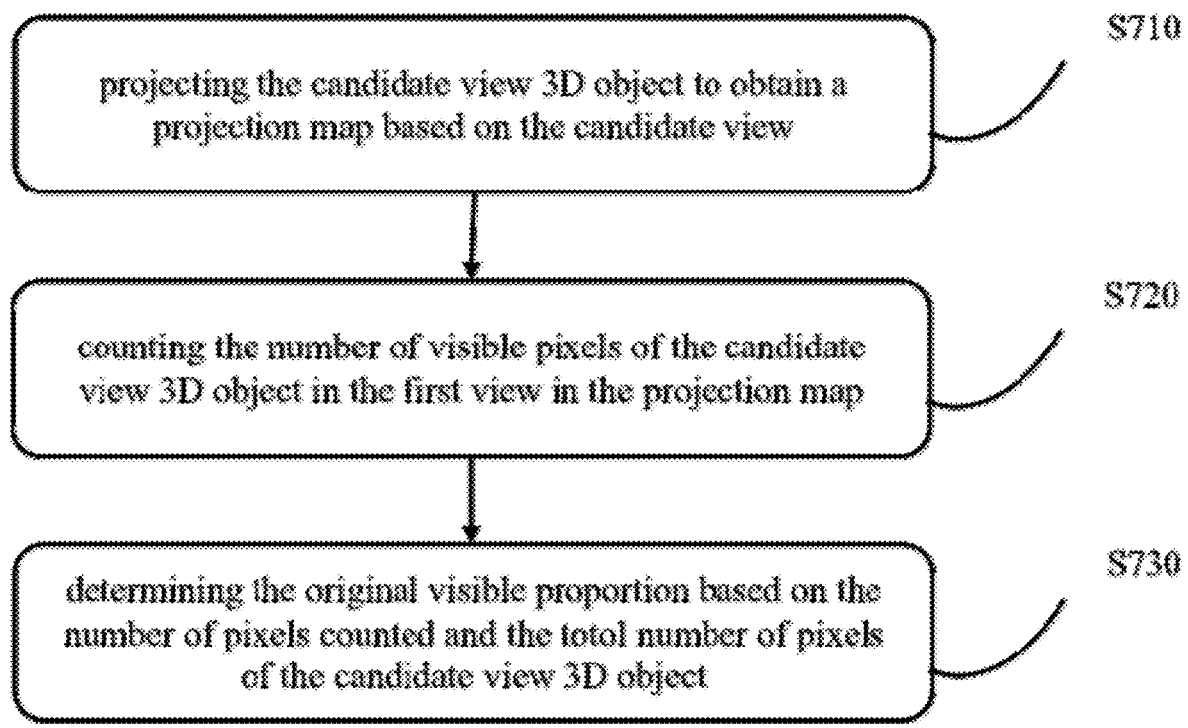
FIG. 7 illustrates a schematic flowchart for determining the original visible proportion according to a embodiment of the present disclosure.

As previously described, the original visible proportion may be the key consideration of determining the complementary view. FIG. 7 illustrates a schematic flowchart for determining the original visible proportion according to an embodiment of the present disclosure. As shown in FIG. 7, said determining the original visible proportion of visible voxels of the candidate view 3D object may include the following steps.

S710: Projecting the candidate view 3D object to obtain a projection map based on the candidate view.

Since the candidate view 3D object may have been rotated to a position facing the candidate view, the visible voxels of the candidate view 3D object in the candidate view may be obtained by projecting the candidate view 3D object in the direction of the candidate view. The pixels of the candidate view 3D object in the projection map may correspond to the visible voxels in the candidate view.

In one example, the projection map can be determined based on the voxels of the candidate view 3D object that are closest to the projection plane in the candidate view, where the projection plane may be a plane perpendicular to the candidate view where the camera is located. If the candidate view is the direction of the X-axis, the voxels of the candidate view 3D object that are closest to the projection plane in the candidate view can be determined by the following equation.

$$d(y, z) = \mathrm{argmin}(P(:, y, z)), \text{ wherein } P(:, y, z) > 0$$

Where P(:, y, z) may denote all voxels of the candidate view 3D object on a line parallel to the x-axis with y-axis coordinates and z-axis coordinates. When the candidate view 3D object may exist voxels at a certain position (x, y, z), P(x, y, z)=1; otherwise, P(x, y, z)=0. In the restricted case, argmin(P(:, y, z)) may denote the minimum value of a distance between the voxels of the candidate view 3D object on the line and the projection plane. According to the above equation, if there are m voxels with P(:, y, z)>0 and the x-axis coordinates of the m voxels may be {x1,x2, ..., xm}, d(y, z) may takes the minimum value of the x-axis coordinates, which is equal to min{x1,x2, ..., xm}. As a result, the projection of the candidate view 3D object may exist on the line. Otherwise, if there are not voxels with P(:, y, z)>0 existing, d(y, z)=0. As a result, there is no projection of the candidate view 3D object on the line. In summary, the projection map of the candidate view 3D object in the candidate view can be obtained.

S720: counting the number of visible pixels of the candidate view 3D object in the first view in the projection map.

It can be understood that the pixels in the projection map may correspond to the visible voxels of the candidate view 3D object in the candidate view. As previously described, the visible voxels of the candidate view 3D object in the candidate view may or may not be visible in the first view of the original 2D image. The step S720 may be used to determine the number of pixels in the projection map that correspond to visible voxels in both the first view and the candidate view.

Specifically, the visible voxels in the first view may be marked. In one example, the visible voxels in the first view may be voxels of the original 3D object determined based on the main view depth map. On the basis of markings of the voxels in the original 3D object, the markings may be remained in the candidate view 3D object after rotation. However the voxels that are marked as visible in the first view may not be visible in the candidate view. The step S720 may count the voxels that are still visible and marked in the candidate view.

In another example, voxels that are not visible in the first view can also be marked. For example, the voxels in the original 3D object determined based on the depth map and voxel cube in the rear view may be marked as voxels that are not visible in the first view.

The number of visible pixelsvof the candidate view 3D object in the first view in the projection map may be obtained based on the number of pixels in the projection map corresponding to the marked voxels.

S730: determining the original visible proportion based on the number of pixels counted and the total number of pixels of the candidate view 3D object. The original visible proportion may be determined by calculating the percentage of the number of pixels counted in step S720 to the total number of pixels of the candidate view 3D object in the projection map.

Figure 8:
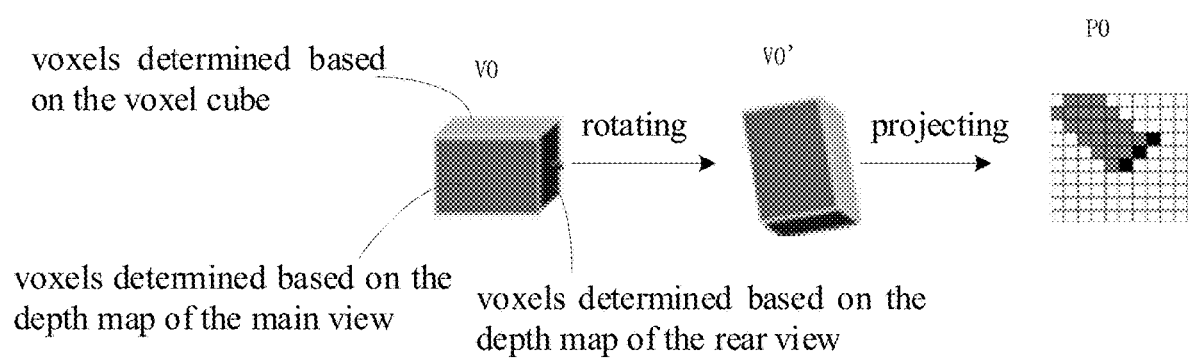
FIG. 8 illustrates the schematic diagram of determining the original visible proportion.

FIG. 8 illustrates the schematic diagram of determining the original visible proportion. V0 may be the original 3D object generated based on the 3D reconstruction of step S110 and S120. The original 3D object may include three main parts: voxels determined based on the depth map of the main view, voxels determined based on the depth map of the rear view and voxels determined based on the voxel cube, where the voxels determined based on the depth map of the main view may be visible in the first view, and other voxels may not be visible in the first view. V0' may be the candidate view 3D object obtained by rotating the original 3D object based on the candidate view. P0 may be the projection map of the candidate view 3D object in the candidate view. P0 may contain pixels corresponding to the visible voxels of the candidate view 3D object in the first view and pixels corresponding to the voxels of the candidate view 3D object that are not visible in the first view. Both may be identified by squares with different gray levels. The original visible proportion may be determined based on the ratio between the former and the sum of the former plus the latter.

In the above technical solution, utilizing the projection map to determine the original visible proportion may be implemented easily and the final 3D reconstruction results may be more accurate.

Figure 9:
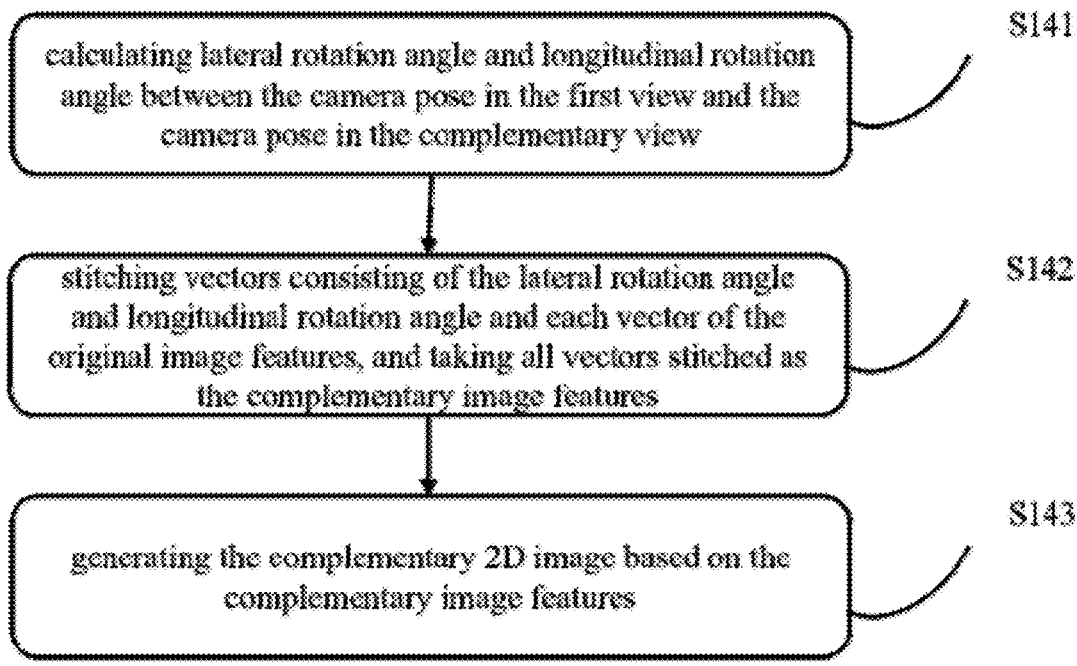
FIG. 9 illustrates a schematic flowchart of generating the complementary 2D image of the step S140 according to an embodiment of the present disclosure.

As previously described, after determining the camera pose in the complementary view, the complementary 2D image of the target object in the complementary view may be generated. FIG. 9 illustrates a schematic flowchart of generating the complementary 2D image of the step S140 according to an embodiment of the present disclosure. The step S140 may include the following steps.

S141: calculating lateral rotation angle and longitudinal rotation angle between the camera pose in the first view and the camera pose in the complementary view.

As previously described, based on the center point of the target object as the origin of the world coordinate system, the camera poses in different views may be equated to the lateral rotation angle (the rotation angle in the XOY plane with respect to the X-axis) and the longitudinal rotation angle (the rotation angle in a plane perpendicular to the XOY with respect to the Z-axis) in the spherical coordinate system, which may be denoted by ($\alpha$, $\beta$). If the camera pose in the first view is ($\alpha 1$, $\beta 1$) and the camera pose in the complementary view is ($\alpha 2$, $\beta 2$), the lateral rotation angle and longitudinal rotation angle between the camera pose in the first view and the camera pose in the complementary view may be expressed as ($\alpha 2-\alpha 1$, $\beta 2-\beta 1$).

S142: stitching vectors consisting of the lateral rotation angle and longitudinal rotation angle and each vector of the original image features, and taking all vectors stitched as the complementary image features.

As previously described, H×W feature vectors can be extracted from each original 2D image, where H×W feature vectors constitute the original image features.

If the dimension of the feature vectors is n. The lateral rotation angle and the longitudinal rotation angle ($\alpha 2-\alpha 1$, $\beta 2-\beta 1$) calculated in step S610 can be stitched to each feature vector and then each feature vector stitched may contain n+2 vectors. For example, one feature vector of the original image features may be denoted as (P1, P2, ..., Pn), then the feature vector stitched may be denoted as (P1, P2, ..., Pn, $\alpha 2-\alpha 1$, $\beta 2-\beta 1$). Each feature vector in the original image features may be stitched, and all the feature vectors stitched may be used as the complementary image features.

S143: generating the complementary 2D image based on the complementary image features.

A complementary 2D image corresponding to the complementary image features may be generated based on the complementary image features using a decoder composed of convolutional neural networks. It can be understood that the decoder may be obtained and trained using sample features and corresponding sample images.

The complementary image feature may be obtained by stitching the rotation angle between the feature vector in the original image features and the camera pose, and the complementary 2D image may be generated based on the complementary image features, which may be simple to operate and easy to implement.

Figure 10:
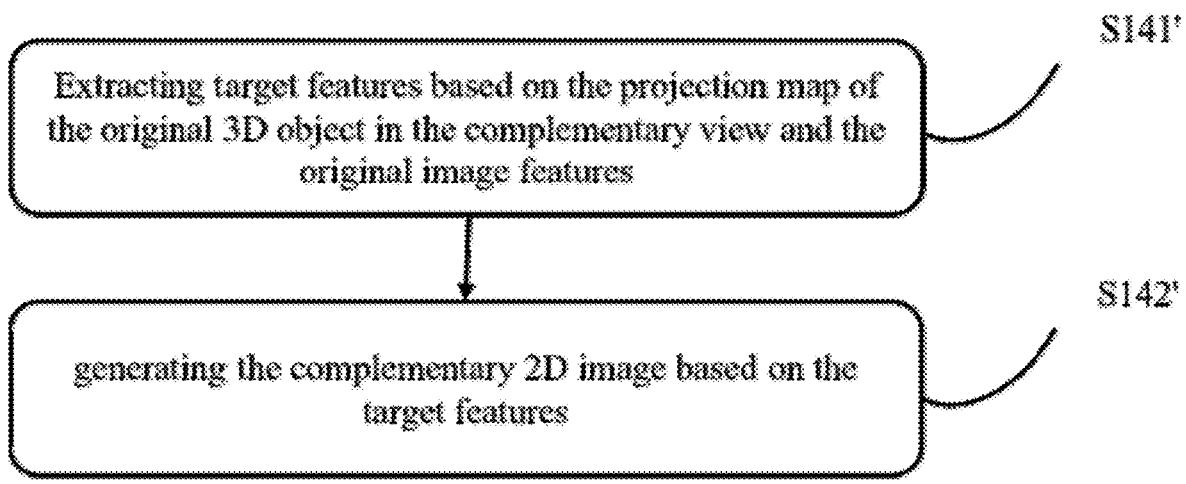
FIG. 10 illustrates a schematic flowchart of generating the complementary 2D image according to another embodiment of the present disclosure.

FIG. 10 illustrates a schematic flowchart of generating the complementary 2D image according to another embodiment of the present disclosure. The specific steps may be as follows.

S141': Extracting target features based on the projection map of the original 3D object in the complementary view and the original image features.

The projection map of the original 3D object in the complementary view may be obtained similarly to that obtaining the projection map of the candidate view 3D object in the candidate view as described in the previous step S710.

It can be understood that in the example described above of selecting the complementary view based on the candidate views, the projection map of the original 3D object in the complementary view can be obtained directly based on the result of step S710.

The projection map of the original 3D object in the complementary view may contain pixels corresponding to the visible voxels of the candidate view 3D object in the first view and pixels corresponding to the voxels of the candidate view 3D object that are not visible in the first view. It can be understood that the former information is derived from the original 2D image, and therefore there is a feature vector corresponding to the former in the original image features extracted from the original 2D image. Therefore, the step S141' may include the following steps: a) For the pixels in the projection map that correspond to the visible voxels of the original 3D object in the first view, the corresponding feature vectors in the target features may be determined based on the original image features. Specifically, the corresponding feature vector in the original image feature can be used as the feature vector in the target feature of the former. b) For pixels in the projection map that correspond to voxels that are not visible in the original 3D object in the first view, the corresponding feature vector in the target feature can be determined based on random noise. For example, the random noise may be used as the corresponding feature vector in the target feature. Optionally, the random noise may take any value in the interval [0,1].

Further, on the basis of that the original 2D image contains a plurality of images in different views, the original image features may correspondingly contain a plurality of features corresponding to each image with different views. For a pixel in the projection map that corresponds to a visible voxel in the original 3D object in the first view, the corresponding feature vectors in all the original image features may be summed and then averaged to use the average value as the target feature for the pixel.

S142': generating the complementary 2D image based on the target features.

Exemplarily, a decoder composed of convolutional neural networks may be utilized to generate a complementary 2D image corresponding to the target features based on the target features extracted in the step S141'. The specific operation can be understood by a person of ordinary skill in the art and will not be repeated herein for the sake of brevity.

Figure 11:
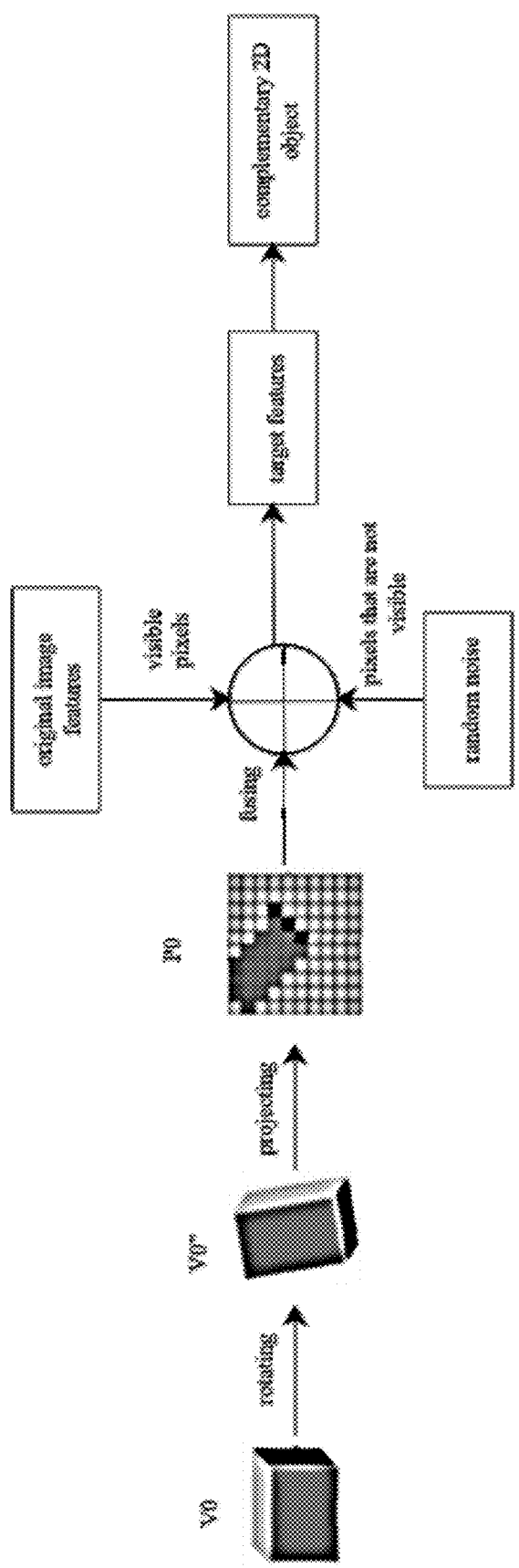
FIG. 11 illustrates a schematic block diagram of generating a complementary 2D image according to an embodiment of the present disclosure.

FIG. 11 illustrates a schematic block diagram of generating a complementary 2D image according to an embodiment of the present disclosure. As shown in FIG. 11, V0 may be the original 3D object generated by 3D reconstruction, V0" may be the complementary view 3D object obtained by rotating the original 3D object based on the complementary view, and P0' may be the projection map of the complementary view 3D object in the complementary view. P0' may contain pixels corresponding to visible voxels of the original 3D object in the first view and pixels corresponding to voxels that are not visible in the first view.

In one example, on the basis of P0', the target features may be generated by extracting the feature vectors of the pixels corresponding to the visible voxels of the original 3D object in the first view and the feature vectors of the pixels corresponding to the voxels that are not visible of the original 3D object in the first view respectively. For the former, the feature vectors can be derived from the original image features extracted from the original 2D image; for the latter, the corresponding feature vectors can be determined based on random noise.

In another example, the step S141' may further include: stitching P0' with the feature vectors determined in step a) and step b) to generate the target features. Specifically, P0' is a matrix of 1×H×W (H may represent the height of the original 2D image and W may represent the width of the original 2D image). The original image features may be a C×H×W tensor as described above, then the feature vectors determined in steps a) and b) may also be a C×H×W feature tensor. P0' is combined with the feature tensor to generate a (C+1)×H×W tensor. The (C+1)×H×W tensor may be the target feature.

In the example, utilizing P0' as a mask in the target features may further improve the accuracy of the 3D reconstruction result.

On the basis of obtaining the target features, the target features may be decoded by a decoder composed of, for example, convolutional neural networks to obtain the corresponding complementary 2D image.

The complementary 2D image generated in the above technical solution may contain more information of the original 2D image and enough complementary information, so that the 3D reconstruction results obtained based on the complementary 2D image may have higher credibility.

It can be understood that the more complementary views are selected, the more complementary 3D objects are generated, and thus the 3D reconstruction results may be closer to the real shape of the target object. Therefore, the process from step S130 to step S160 can be iterated several times and the final 3D reconstruction result can be determined based on that whether the iteration termination condition is satisfied.

Figure 12:
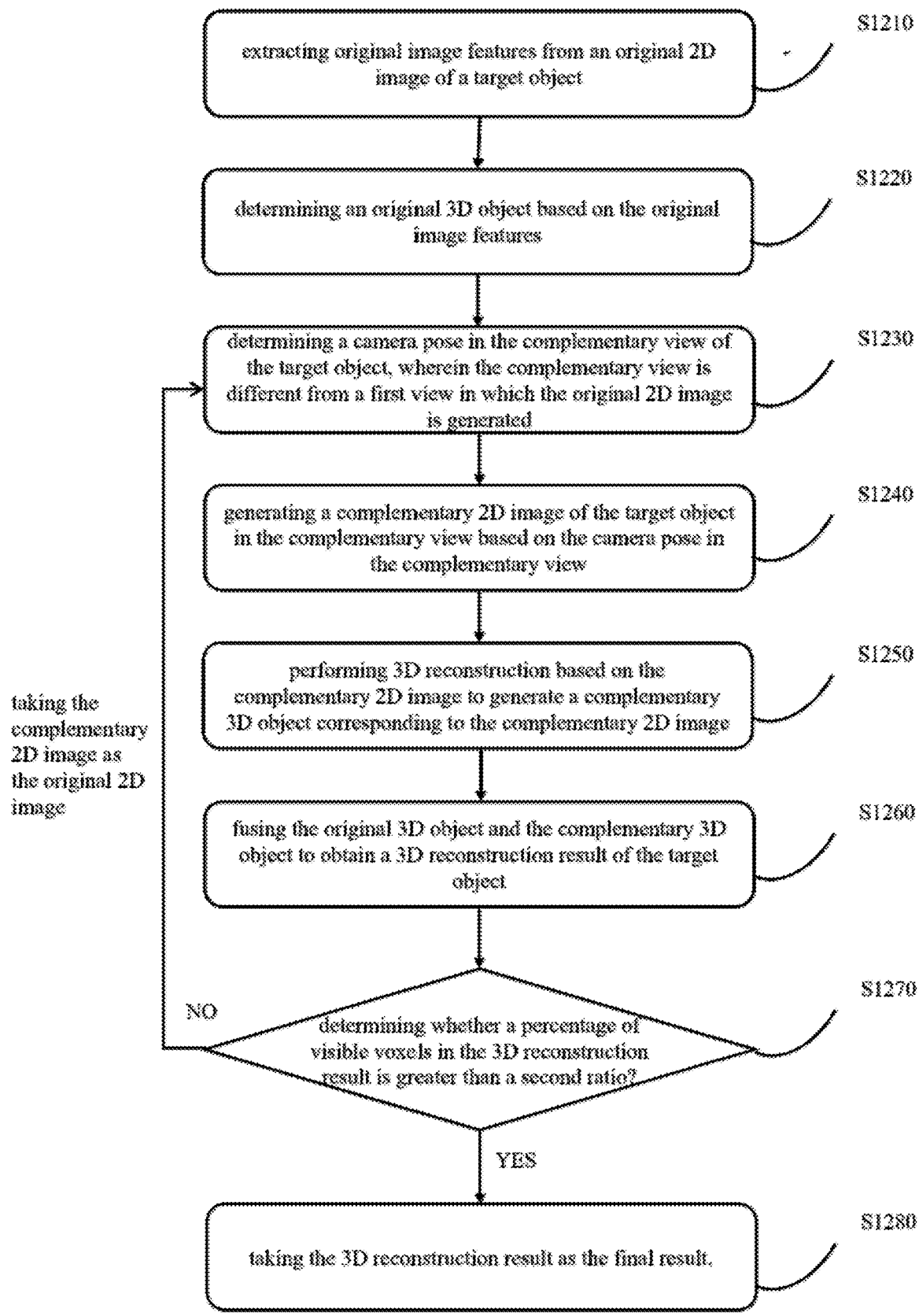
FIG. 12 illustrates a schematic flowchart of a method for 3D reconstruction according to another embodiment of the present disclosure.

FIG. 12 illustrates a schematic flowchart of a method for 3D reconstruction according to another embodiment of the present disclosure. As shown in FIG. 12, the method for 3D reconstruction may include the following steps.

S1210: Extracting original image features from an original 2D image of a target object.

S1220: determining an original 3D object based on the original image features.

S1230: determining a camera pose in the complementary view of the target object, where the complementary view is different from a first view in which the original 2D image is generated.

S1240: generating the complementary 2D image of the target object in the complementary view based on the camera pose of the complementary view.

S1250: performing 3D reconstruction based on the complementary 2D image to generate a complementary 3D object corresponding to the complementary 2D image.

S1260: Fusing the original 3D object and the complementary 3D object to obtain a 3D reconstruction result of the target object. The above steps may be similar to steps S110-S160 and will not be repeated herein.

S1270: Determining whether the percentage of visible voxels in the 3D reconstruction result is greater than the second ratio.

The percentage of visible voxels in the 3D reconstruction result is the percentage of the visible voxels of the 3D reconstruction result in the first view among the visible voxels in the complementary view. For example, if there are m visible voxels in the complementary view, and the number of voxels visible in the first view is M, the percentage of visible voxels is M/m. It can be understood that the percentage of visible voxels may reflect the confidence of the 3D reconstruction result. The second ratio can be any value between 70% and 90%. In one example, the second ratio may be 85% the value balances the consumption of computational resources and the accuracy of the computational results.

If the percentage of visible voxels in the 3D reconstruction result is not greater than the second ratio, the complementary 2D image may be taken as the original 2D image and transferred to step S1230. Thereby, a new complementary 2D image is acquired again for 3D reconstruction based on a new complementary view. If the percentage of visible voxels is not greater than the second ratio, it means that there is still a gap between the current 3D reconstruction result and the target object, so it is necessary to perform 3D reconstruction based on the camera pose of the new complementary view again.

If the percentage of visible voxels in the 3D reconstruction result is greater than the second ratio, step S1280 may be executed.

S1280: taking the 3D reconstruction result as the final result. The method for 3D reconstruction ends.

If the percentage of visible voxels is greater than the second ratio, it means that the 3D reconstruction result generated in the current view is already closer to the real 3D object, the 3D reconstruction result can be taken as the final result.

Through the above steps, it can be ensured that the 3D reconstruction result obtained after a limited number of iterations is the expected result, further ensuring the quality of the 3D reconstruction object.

Figure 13:
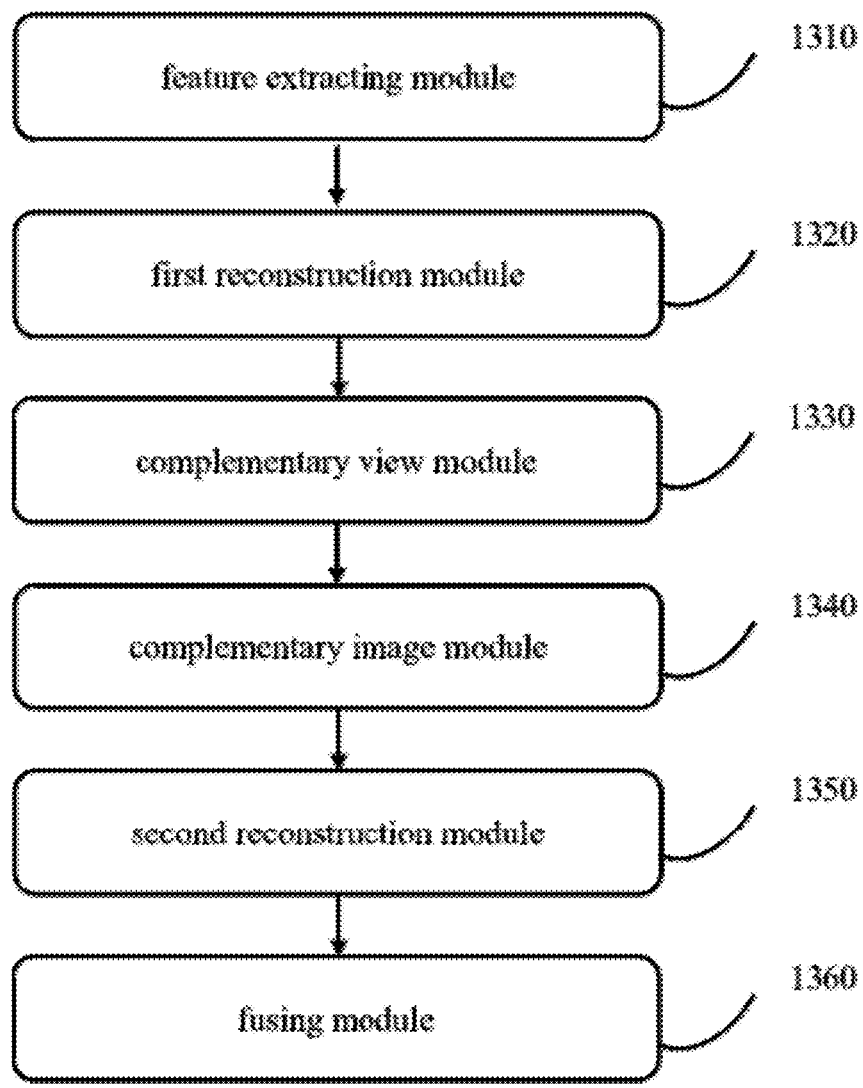
FIG. 13 illustrates a schematic block diagram of a device for 3D reconstruction according to an embodiment of the present disclosure.

According to another aspect of the present disclosure, a device for 3D reconstruction is also provided. FIG. 13 illustrates a schematic block diagram of a device for 3D reconstruction according to an embodiment of the present disclosure.

As shown in FIG. 13, the device 1300 includes a feature extracting module 1310, a first reconstruction module 1320, a complementary view module 1330, a complementary image module 1340, a second reconstruction module 1350 and a fusing module 1360.

Each module may execute various steps/functions of the method for 3D reconstruction described above respectively. Only the main functions of the components of the device 1300 are described below, and the details already described above are omitted.

The feature extracting module 1310, may be configured to extract the original image features from the original 2D image of the target object.

The first reconstruction module 1320, may be configured to determine the original 3D object based on the original image features.

The complementary view module 1330, may be configured to determine a camera pose in the complementary view of the target object, where the complementary view is different from the first view in which the original 2D image is generated.

The complementary image module 1340, may be configured to generate the complementary 2D image of the target object in the complementary view based on the camera pose of the complementary view.

The second reconstruction module 1350, may be configured to perform 3D reconstruction based on the complementary 2D image to generate a complementary 3D object corresponding to the complementary 2D image.

The fusing module 1360, may be configured to fuse the original 3D object and the complementary 3D object to obtain the 3D reconstruction result of the target object.

According to a further aspect of the present disclosure, there is also provided a system for 3D reconstruction including: a processor and a memory, where the memory stores computer program instructions, the computer program instructions being used to perform the method for 3D reconstruction described above when executed by the processor.

Figure 14:
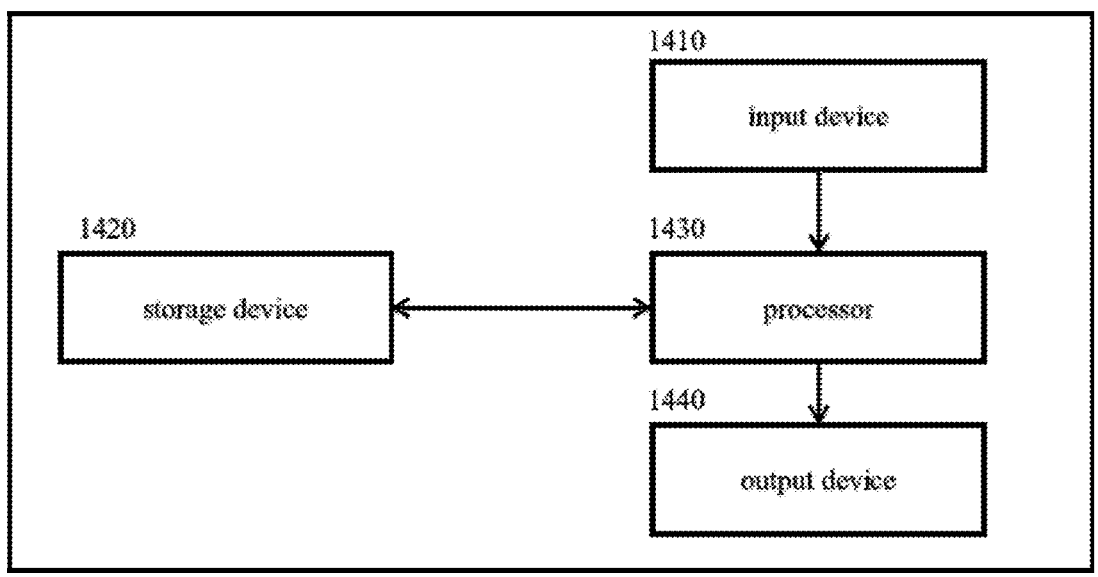
FIG. 14 illustrates a schematic block diagram of a system for 3D reconstruction according to an embodiment of the present disclosure.

FIG. 14 illustrates a schematic block diagram of a system for 3D reconstruction according to an embodiment of the present disclosure. As shown in FIG. 14, the system 1400 may include an input device 1410, a storage device 1420, a processor 1430, and an output device 1440.

The input device 1410 is configured to receive operation instructions entered by an user and to collect data. The input device 1410 may include one or more of a keyboard, a mouse, a microphone, a touch screen, and an image capture device.

The storage device 1420 may store computer program instructions for implementing the steps in the method for 3D reconstruction according to embodiments of the present disclosure.

The processor 1430 is configured to execute the computer program instructions stored in the storage device 1420 to perform the steps of the the method for 3D reconstruction according to the embodiment of the present disclosure, and is configured to implement the feature extracting module 1310, the first reconstruction module 1320, the complementary view module 1330, the complementary image module 1340, the second reconstruction module 1350 and the fusing module 1360 in the device for 3D reconstruction according to the embodiment of the present disclosure.

The output device 1040 is configured to output various information (e.g., images and/or sound) to an external party (e.g., a user) and may include one or more of a display, a speaker, etc.

In one embodiment, the system 1400 may perform following steps when the computer program instructions is executed by the processor 1430:

Extracting original image features from an original 2D image of a target object.

Determining an original 3D object based on the original image features.

Determining a camera pose in the complementary view of the target object, where the complementary view is different from a first view in which the original 2D image is generated.

Generating the complementary 2D image of the target object in the complementary view based on the camera pose of the complementary view.

Performing 3D reconstruction based on the complementary 2D image to generate a complementary 3D object corresponding to the complementary 2D image.

Fusing the original 3D object and the complementary 3D object to obtain a 3D reconstruction result of the target object.

Further, according to a further aspect of the present disclosure, there is provided a storage medium on which program instructions are stored. when the program instructions are executed by a computer or processor, the computer or processor may be enabled to perform the corresponding steps of the above-described method for 3D reconstruction according to an embodiment of the present disclosure, and the program instructions may be configured to implement the corresponding module in the above-described device for 3D reconstruction according to an embodiment of the present disclosure or the above-described module for the system for 3D reconstruction. The storage medium may include, for example, a memory card of a smart phone, a storage component of a tablet computer, a hard disk of a personal computer, a read-only memory (ROM), an erasable programmable read-only memory (EPROM), a portable compact disk read-only memory (CD-ROM), a USB memory, or any combination of the storage mediums. The computer-readable storage medium may be any combination of one or more computer-readable storage media.

In one embodiment, the computer program instructions, when execute by the computer or processor, may cause the computer or processor to perform the following steps: Extracting original image features from an original 2D image of a target object.

Determining an original 3D object based on the original image features.

Determining a camera pose in the complementary view of the target object, where the complementary view is different from a first view in which the original 2D image is generated.

Generating the complementary 2D image of the target object in the complementary view based on the camera pose of the complementary view.

Performing 3D reconstruction based on the complementary 2D image to generate a complementary 3D object corresponding to the complementary 2D image.

Fusing the original 3D object and the complementary 3D object to obtain a 3D reconstruction result of the target object.

While exemplary embodiments have been described by referring to the accompanying drawings herein, it should be understood that the above exemplary embodiments are illustrative only and are not intended to limit the scope of the present disclosure thereto. An ordinary person skilled in the art may make various modifications and alterations without departing from the scope and spirit of the present disclosure. It is intended that all these modifications and alterations be encompassed within the appended claims.

Those skilled in the art may understand that the technical solutions of the present disclosure may be implemented in the form of electronic hardware, computer software, or integration of the hardware and software by combining the exemplary units and algorithm steps described in the embodiments of the present disclosure. Whether the functions are implemented in hardware or software depends on specific applications and designed limitations of the technical solutions. Those skilled in the art may use different methods to implement the functions in the case of the specific applications. However, this implementation shall not be considered going beyond the scope of the present disclosure.

In the exemplary embodiments provided in the present disclosure, it should be understood that the disclosed system, apparatus, and device, and method may also be implemented in other manners. For example, the apparatus embodiments are merely exemplary ones. For example, the units are divided only by the logic function. In practical implementation, other division manners may also be used. For example, a plurality of units or elements may be combined or may be integrated into a system, or some features may be ignored or not implemented.

A large number of specific details are described in the description provided herein. However, it can be appreciated that embodiments of the disclosure can be implemented without these specific details. In some examples, known methods, structures and techniques are not shown in detail so as not to blur understanding of the description.

Similarly, it should be appreciated that in order to simplify the disclosure and help to understand one or more of various aspects of the disclosure, some features of the disclosure may, in certain cases, be combined in a single embodiment, diagram or description thereof in the above description of illustrative embodiments of the disclosure. However, this method of the disclosure is not to be interpreted as reflecting an intention that the claimed embodiments of the subject matter requires more features than are expressly recited in each claim. More specifically, as the following claims reflect, the disclosure may lie in less than all features of a single disclosed embodiment. Thus the claims following the specific embodiments are hereby incorporated into the the detailed description, with each claim standing on its own as a separate embodiment.

It will be understood by those skilled in the art that all features disclosed in this specification (including accompanying claims, abstracts and drawings) and all processes or units of any disclosed method or apparatus can be combined by any combination except for the mutual exclusion of features. Unless otherwise expressly stated, each feature disclosed in this specification (including accompanying claims, abstracts, and drawings) may be replaced by an alternative feature providing the same, equivalent, or similar purpose.

Furthermore, while some embodiment described herein include some but not other features included in other embodiments, combinations of features of different embodiments are meant to be within the scope of the disclosure and form different embodiments, as would be understood by those skilled in the art. For example, in the following claims, any one of the claimed embodiments can be combined in any combination.

Each component embodiment of the present disclosure may be implemented in hardware, in software modules running on one or more processors, or in combination thereof. It should be understood by those skilled in the art that some or all functions of some modules in the image registration apparatus and the image stitching device according to the embodiment of the present disclosure can be realized in practice by using a microprocessor or a digital signal processor (DSP). The present disclosure may also be implemented as an apparatus program (for example, a computer program and a computer program product) for performing part or all of the methods described herein. Such a program to implement the present disclosure may be stored on a computer-readable medium, or may have one or more signals in the form. Such signals can be downloaded from Internet sites, or provided on carrier signals, or in any other form.

It should be noted that the above-mentioned embodiments illustrate rather than limit the disclosure, and that those skilled in the art will be capable of designing many alternative embodiments without departing from the scope of the disclosure as defined by the appended claims. Any reference sings placed between parentheses shall not be construed as limiting the claim. The word "including" does not exclude the presence of elements or steps not listed in a claim. The word "a" or "an" preceding an element does not exclude the presence of a plurality of such elements. The disclosure can be implemented by means of hardware including several distinct elements and by means of a suitable programmed computer. Several of these means can be embodied by one and the same item of hardware. The use of the words first, second and third etc do not indicate any ordering. These words are to be interpreted as names.

The above, only for the specific embodiment of the present disclosure or a description of the specific embodiment, the scope of protection of the present disclosure is not limited to this, any technical person familiar with the technical field disclosed in the scope of the technology, can easily think of change or replacement, should be covered within the scope of protection of the present disclosure. The protection scopes of the present disclosure shall be subject to the protection scopes of the claims.

What is claimed is:

1. A method for a three-dimensional (3D) reconstruction, comprising:
   extracting original image features from an original two-dimensional (2D) image of a target object;
   determining an original 3D object based on the original image features;
   determining a camera pose in a complementary view of the target object, wherein the complementary view is different from a first view, wherein the original 2D image is generated in the first view;
   generating a complementary 2D image of the target object in the complementary view based on the camera pose in the complementary view;
   performing the 3D reconstruction based on the complementary 2D image to generate a complementary 3D object corresponding to the complementary 2D image; and
   fusing the original 3D object and the complementary 3D object to obtain a 3D reconstruction result of the target object,
   wherein the step of determining the original 3D object based on the original image features comprises:
      decoding the original image features by a deep neural network to obtain a depth map of the target object;
      decoding the original image features by a voxel neural network to obtain a voxel cube of the target object; and
      determining the original 3D object based on the depth map and the voxel cube.

2. The method according to claim 1, wherein the step of determining the original 3D object based on the depth map and the voxel cube comprises:
   determining visible voxels in the original 3D object based on the depth map; and
   determining other voxels in the original 3D object based on the voxel cube.

3. The method according to claim 2, wherein the depth map of the target object comprises a depth map of a main view of the target object and a depth map of a rear view of the target object.

4. The method according to claim 1, wherein the original 2D image comprises a plurality of images in different views;
   wherein the step of determining the original 3D object based on the original image features comprises:
   determining split-view 3D objects based on the original image features extracted from the original 2D image in each of different views respectively; and
   fusing all the split-view 3D objects to obtain the original 3D object.

5. The method according to claim 4, wherein the step of fusing all the split-view 3D objects to obtain the original 3D object comprises:
   rotating each of the split-view 3D objects to a standard pose to obtain a standard view 3D object corresponding to each of the split-view 3D objects; and
   determining voxels of the original 3D object based on voxels of all standard view 3D objects.

6. The method according to claim 5, wherein the step of determining the voxels of the original 3D object based on the voxels of all the standard view 3D objects comprises:
   for each location involved in all the standard view 3D objects, when a number of standard view 3D objects having voxels presented at a location among all the standard view 3D objects is more than a first percentage, determining that the original 3D object has voxels presented at the location.

7. The method according to claim 1, wherein the step of generating the complementary 2D image of the target object in the complementary view based on the camera pose in the complementary view comprises:
   extracting target features based on a projection map of the original 3D object in the complementary view and the original image features; and
   generating the complementary 2D image based on the target features.

8. The method according to claim 7, wherein the step of extracting the target features based on the projection map of the original 3D object in the complementary view and the original image features comprises:
   for first pixels in the projection map, wherein the first pixels in the projection map correspond to visible voxels of the original 3D object in the first view, determining first feature vectors of the target features based on the original image features; and
   for second pixels in the projection map, determining second feature vectors of the target features based on a random noise.

9. The method according to claim 8, wherein the original 2D image comprises a plurality of images in different views, and the original image features comprise a plurality of features corresponding to each of the plurality of images in different views;
   wherein the step of determining the first feature vectors of the target features based on the original image features comprises:
      for the first pixels in the projection map, wherein the first pixels in the projection map correspond to the visible voxels in the original 3D object in the first view, averaging the feature vectors of the original image features to obtain an average value, and configuring the average value as the first feature vector of the target feature.

10. The method according to claim 8, wherein the step of extracting the target features based on the projection map of the original 3D object in the complementary view and the original image features comprises:
    stitching the projection map, the first feature vectors and the second feature vectors determined to generate the target features.

11. The method according to claim 1, wherein the step of fusing the original 3D object and the complementary 3D object to obtain the 3D reconstruction result of the target object comprises:
    determining whether a percentage of visible voxels in the 3D reconstruction result is greater than a second ratio;
    in response to that the percentage of the visible voxels in the 3D reconstruction result is less than or equal to the second ratio, taking the complementary 2D image as the original 2D image, and performing the 3D reconstruction again based on the camera pose in the complementary view until the percentage of the visible voxels in the 3D reconstruction result is greater than the second ratio.

12. A method for a three-dimensional (3D) reconstruction, comprising:
    extracting original image features from an original two-dimensional (2D) image of a target object;
    determining an original 3D object based on the original image features;
    determining a camera pose in a complementary view of the target object, wherein the complementary view is different from a first view, wherein the original 2D image is generated in the first view;

generating a complementary 2D image of the target object in the complementary view based on the camera pose in the complementary view;

performing the 3D reconstruction based on the complementary 2D image to generate a complementary 3D object corresponding to the complementary 2D image; and fusing the original 3D object and the complementary 3D object to obtain a 3D reconstruction result of the target object, wherein the step of determining the camera pose in the complementary view of the target object comprises:
  obtaining a camera pose in at least one of candidate views predetermined;
  for the camera pose of each candidate view of the at least one of the candidate views,
    rotating the original 3D object to the candidate view to obtain a candidate view 3D object;
    determining an original visible proportion of visible voxels of the candidate view 3D object; and
    determining the camera pose in the candidate view as the camera pose in the complementary view based on the original visible proportion within a first range.

13. The method according to claim 12, wherein the step of determining the original visible proportion of the visible voxels of the candidate view 3D object comprises:
  projecting the candidate view 3D object to obtain a projection map based on the candidate view;
  counting a number of visible pixels of the candidate view 3D object in the first view in the projection map; and
  determining the original visible proportion based on the number of the visible pixels counted and a total number of pixels of the candidate view 3D object.

14. A method for a three-dimensional (3D) reconstruction, comprising:
  extracting original image features from an original two-dimensional (2D) image of a target object;
  determining an original 3D object based on the original image features;
  determining a camera pose in a complementary view of the target object, wherein the complementary view is different from a first view, wherein the original 2D image is generated in the first view;
  generating a complementary 2D image of the target object in the complementary view based on the camera pose in the complementary view;
  performing the 3D reconstruction based on the complementary 2D image to generate a complementary 3D object corresponding to the complementary 2D image; and
  fusing the original 3D object and the complementary 3D object to obtain a 3D reconstruction result of the target object,
  wherein the step of generating the complementary 2D image of the target object in the complementary view based on the camera pose in the complementary view comprises:
    calculating a lateral rotation angle between a camera pose in the first view and the camera pose in the complementary view and a longitudinal rotation angle between the camera pose in the first view and the camera pose in the complementary view;
    stitching vectors consisting of the lateral rotation angle and the longitudinal rotation angle and each vector of the original image features to obtain stitched vectors, and taking all the stitched vectors as complementary image features; and
    generating the complementary 2D image based on the complementary image features.

15. A system for a 3D reconstruction, comprising: a processor and a memory, wherein computer program instructions are stored in the memory, and the computer program instructions are executed by the processor to perform the method according to claim 1.

16. A non-transitory storage medium, wherein computer program instructions are stored in the non-transitory storage medium, and the computer program instructions are executed to perform the method according to claim 1.

* * * * *